United States Patent

[11] 3,615,338

| [72] | Inventor | Bobby J. Boyles<br>Perrysburg, Ohio |
|---|---|---|
| [21] | Appl. No. | 805,244 |
| [22] | Filed | Mar. 7, 1969 |
| [45] | Patented | Oct. 26, 1971 |
| [73] | Assignee | Libbey-Owens-Ford Company<br>Toledo, Ohio |

[54] APPARATUS FOR PRESS BENDING GLASS SHEETS
6 Claims, 3 Drawing Figs.

[52] U.S. Cl..................................................... 65/291, 65/290, 65/273
[51] Int. Cl. .................................................... C03b 23/02
[50] Field of Search............................................ 65/273, 275, 287, 288, 289, 290

[56] References Cited
UNITED STATES PATENTS

| 3,256,080 | 6/1966 | Vranken....................... | 65/275 X |
|---|---|---|---|
| 3,265,484 | 8/1966 | Ritter, Jr. ..................... | 65/275 X |

Primary Examiner—Arthur D. Kellogg
Attorney—Collins and Oberlin

ABSTRACT: In apparatus for bending glass sheets in which at least one of the mold members comprises a relatively narrow shaping rail which contacts only a portion of the sheet, a plurality of yieldable resilient members mounting the rail on its base member. The resilient mounting insures that the entire area of the shaping rail will contact the sheet regardless of minor variations in the contour of the shaping surface due to heat distortion and/or extended use.

PATENTED OCT 26 1971 3,615,338

INVENTOR
Bobby J. Boyles

BY Collins & Oberlin
ATTORNEYS

APPARATUS FOR PRESS BENDING GLASS SHEETS

The present invention relates to improved apparatus for bending glass sheets, and more particularly to improved means for mounting the mold members in a glass sheet bending apparatus.

Curved or bent sheets of glass are widely used as glazing closures particularly in vehicles such as automobiles and the like. When intended for such use the sheets must be bent to precisely defined curvatures determined by the size and shape of the openings in which they are to be mounted, and by the overall styling of the vehicle. One procedure for producing curved glazing closures of this type includes heating substantially flat glass sheets to an elevated temperature at which the glass softens, and then pressing the softened sheets between male and female mold members having complemental shaping surfaces contoured to conform to the desired curvature of the finished sheets.

In order to obtain accuracy of curvature in the bent sheets while maintaining the area of contact between the mold and the glass as low as possible it has become a general practice to construct the male mold member with a substantially continuous shaping surface which contacts the entire surface of the sheet, and the female mold member with an outline or ring-type shaping surface which contacts only the marginal edge portions of the sheet.

Heretofore, it has been the practice to provide some resilient support for the male mold member and to make the female, or ring-type mold member rigid, depending on the resilient mounting of the male member both to cushion the sheet against undue pressure as the mold members are moved together into pressing engagement with the glass, and to make the male member somewhat self-centering.

It has been discovered, however, that unlike the relatively massive continuous mold member, the ring-type member, which comprises a relatively narrow rail, is more adversely affected by the high temperature associated with the bending process, and by variations in temperature as successive sheets are conveyed into the apparatus, bent, and then transferred out. A rigidly supported shaping rail cannot readily adjust to such variations and distortion often occurs, leaving gaps between the shaping surface and the sheet which, if severe enough, can cause breakage of the sheet due to uneven pressure distribution. The most common problem, however, is failure of the bent sheet to meet applicable form standards.

If the pressure applied is increased to compensate for this condition other areas will be subjected to excessive pressure, which can also cause breakage or off-form conditions. As a result of the above factors, a mold member of this type can be left in service for a relatively short time before it has to be reworked to correct even relatively small degrees of distortion.

While this problem is discussed herein as it applies to a ring-type mold member, it can be appreciated that similar conditions can exist in any bending process wherein at least one of the mold members is relatively narrow and of low mass.

Therefore, it is an important object of this invention to provide means for compensating for minor distortion of the shaping rail of a mold member which contacts a portion only of the sheet being bent.

Another object of the invention is to minimize such distortion.

Another object is to provide such compensating means by means which will not adversely affect the alignment of the mold members.

To accomplish these objectives, the present invention provides resilient mounting means for the shaping rail, comprising a plurality of yieldable resilient members which space the rail above a base member. By mounting the rail resiliently, much of the variation which occurs can be taken up within the mounting members when the mold members are pressed against the sheet. The result will be to eliminate the need for rework when only minor variations occur in the shaping rail due to heat distortion. In order to maintain alignment the invention also provides means restricting deflection of the resilient members to a direction toward and away from the opposite mold member.

Other objects and advantages will become more apparent during the course of the following description when taken in connection with the accompanying drawings.

In the drawings wherein like numerals are employed to designate like parts throughout the same:

Figure 1:
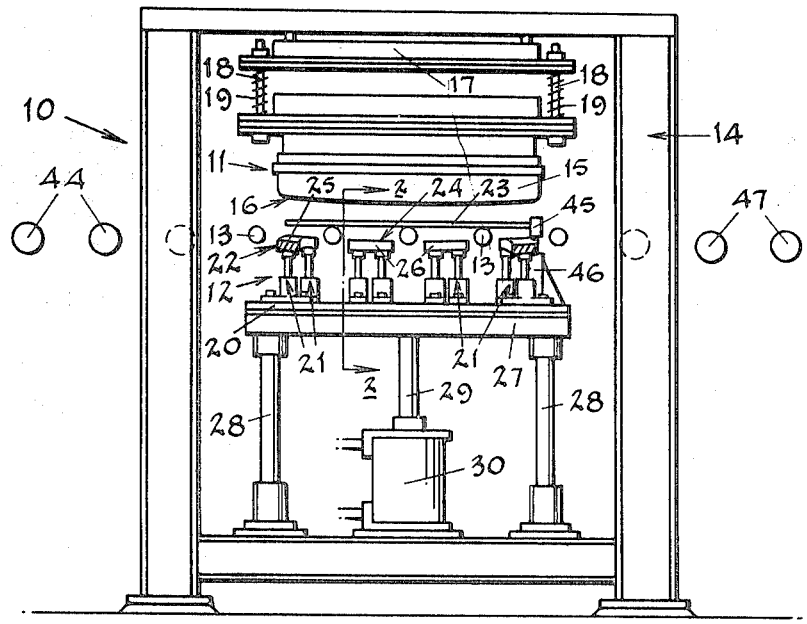
FIG. 1 is a side elevation of a bending apparatus incorporating a bending mold constructed in accordance with the invention.
Figure 2:
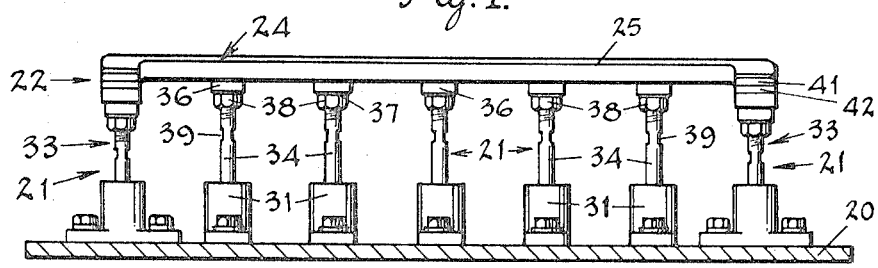
FIG. 2 is a sectional view taken along line 2—2 of FIG. 1.

For purposes of illustration the present invention will be described herein as it is incorporated into a bending mold of the type in which the lower mold member comprises a plurality of segments spaced apart to provide clearance for the conveyor rolls.

Referring to the drawings, the press bending apparatus, indicated generally by the numeral 10, consists essentially of a substantially stationary upper male mold member 11, a movable, lower female mold member 12, and a series of supporting conveyor rolls 13, all suitably mounted within a rigid framework 14.

The substantially stationary male mold member 11 comprises a cuplike shaping element 15 provided with a continuous shaping surface 16 conforming to the desired curvature of the sheet when bent. The mold member 11 is resiliently supported from a mounting frame 17, which depends from the main framework 14, by bolts 18. Springs 19 surround the bolts and space the mold member 11 from the frame H17. The springs provide some cushioning to aid in preventing excessive pressure from being exerted on the glass sheet by the female mold member 12 as it moves upward into pressing engagement with the male mold member 11. This mounting also permits some lateral movement to take up minor variations in alignment with the lower mold member.

The female mold member 12 is of outline or ring-type construction and comprises a base member 20, a plurality of mounting member, indicated generally by the numeral 21, upstanding from said base member, and a shaping rail 22 which is fixed to the tops of the mounting members 21. The shaping rail 22 conforms in outline to the glass sheets 23 to be bent, and a shaping surface 24 conforming to the desired curvature of the sheet is formed on the upper surface thereof. In the illustrative embodiment the female mold member 12 is vertically movable to lift a glass sheet 23 to be bent from the conveyor rolls 13 into pressing engagement with the male mold member 11, and in order to provide clearance for the rolls the shaping rail 22 is made up of a plurality of segments or bars including end bars 25 extending parallel to the conveyor rolls 13, and side bars 26 extending transversely to the conveyor rolls and spaced apart between them.

To provide relative movement between the mold members, the base 20 of the lower mold member 12 is mounted on a carriage 27 which is supported by guide members 28. The guide members allow vertical movement only, said movement being provided by the ram 29 of an air cylinder 30 which bears against the carriage 27.

Figure 3:
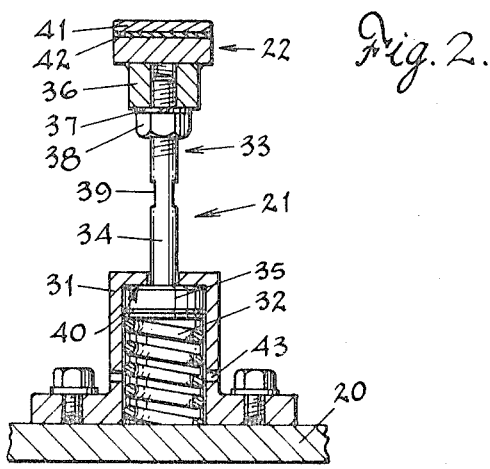
FIG. 3 is an enlarged sectional view of one of the mounting members.

According to the invention, as shown in FIG. 3, each of the mounting members 21 comprises a hollow, cylindrical housing 31 which is bolted, or otherwise fastened to the base member 20, a coil spring 32 which fits fairly closely within the housing 31, allowing only for expansion due to heat and compression, and a rod 33 having a stem portion 34 attached to the rail, and a head 35 bearing against the spring.

The stem 34 and head 35 are fastened rigidly together (or they could be fabricated of a single piece of stock) and are mounted within the housing with the stem 34 projecting upwardly through a hole provided therein. As illustrated, the opposite end of the stem is threaded and is received in a boss 36 formed on or fastened to the underside of the shaping rail 22. To insure proper retention of the stem a lockwasher 37 and locknut 38 are provided. The stem 34 illustrated herein is round, and wrench flats 39 are provided to facilitate adjustment.

The head 35 is a close sliding fit within the housing 31 in order to insure that deflection will occur only in a direction parallel to the plane of movement of the mold member, i.e. normal to the plane of the sheet to be bent. This is important both to insure that there will be no undue lateral shifting of the shaping surface as it contacts the glass, and also to insure proper alignment of the mold members. While a certain amount of lateral self-centering of the continuous male mold member is desirable, such movement of the rail, particularly when it is segmented as illustrated, would make it nearly impossible to obtain a uniform curvature.

To further insure accurate alignment, when the mold is in the unloaded condition as shown the spring 32 is allowed to be compressed sufficiently to insure that it will maintain the head 35 flat against the inside top surface 40 of the housing 31. In this way, the shaping rail 22 can be accurately positioned initially by adjusting the stems 34 in the threaded bosses 36 and then locking them in place. Where the curvature is such that there is a significant variation in the height of the rail 22 above the base, it may be necessary to provide rods of varying length in order to insure uniform initial tension in the springs.

In order to minimize distortion as much as possible it is a common practice to insulate the shaping rail 22 and also provide a nonabrasive surface in contact with the glass by means of a layer of heat-resistant material 41, generally comprising glass or ceramic fibers bonded together and adhered to the rail by a suitable layer of adhesive 42.

The invention also contemplates cooling the mounting members as a means to further minimize heat distortion. To this end, each of the housings 31 is provided with two or more holes 43, one of which can be threaded to receive a fitting (not shown) for connection to a cooling air supply. In applications where positive cooling is not absolutely necessary it is still desirable to include one or more holes near the base of the housing in order to prevent undue compression of the air within.

When a glass sheet 23 is pressed between the mold members the stroke of the ram 29 is adjusted so that the springs 32 will deflect about one-eighth inch under normal conditions. Since the shaping rail is supported by a plurality of separate resilient mounting members any given section of the rail has more freedom to expand or contract than would be the case if the rail were rigidly mounted. Although this freedom is still limited the distortion which does occur is more likely to be localized and capable of being compensated for by the deflection of the springs when the mold members are brought together.

When the lower mold member 12 is made up of individual segments, as in the illustrative embodiment, the individual support provided by the mounting members 21 greatly simplifies the initial alignment of the segments since minor variations in the initial height of the segments can be taken up by the springs during the pressing operation while still insuring a relatively uniform pressure.

In a typical operational cycle, glass sheets 23 heated to substantially the softening point are transferred from a furnace (not shown) into the bending apparatus by entry conveyor rolls 44 and are received in position to be bent on the rolls 13. As the sheet enters the bending apparatus a photocell or other suitable detection device initiates a bending cycle in which the sheet is stopped between the mold members 11 and 12 by locator stops 45 (one of two shown) which are moved into and out of the path of sheet movement by air cylinders 46 mounted on the base member 20, after which the air cylinder 30 causes the lower member 12 to move upward, lifting the glass sheet 23 into pressing engagement with the upper mold member 11.

When the sheet contacts the upper mold member 11, the springs 32 compress a substantially uniform amount to apply a uniform bending pressure to the sheet. As the mold is used for a period of time heat variations and wear will tend to distort the shaping rail; however, since the bending force is, in effect, applied by the plurality of springs rather than by the cylinder 30, the greater flexibility afforded thereby will allow minor variations in the shaping surface to be taken up by more or less deflection of the individual springs to insure that the shaping surface will contact the glass without exerting excessive pressure on it.

As each sheet 23 is lifted from the rolls 13, the stope 45 are lowered to a point below the level of the top surfaces of the rolls 13 so that after the glass sheet 23 has been pressed between the mold members and returned to the rolls 13 by lowering the lower mold member 12, it is free to be immediately transferred from the bending apparatus onto exit conveyor rolls 47.

Another practical application of the invention is in conjunction with the type of bending apparatus in which a sheet is supported in bending relation to a mold member and the mold member is then accelerated at a rate which will cause the sheet to bend into conformity with the mold under the influence of inertial forces. When this method is used to bend sheets having relatively sharply curved end portions it is sometimes necessary to include one or more auxiliary shaping rails which engage at least portions of the ends of the sheet when the moving member approaches the top of its upward stroke. (Apparatus of this type is disclosed in application Ser. No. 731,973 of George F. Ritter, Jr. and Frank J. Hymore, filed May 24, 1968 now U.S. Pat. No. 3,554,724 ). By providing the auxiliary shaping rail with a plurality of resilient mounting members minor variations can be compensated for without frequent rework and stroke adjustment.

It is to be understood that the form of the invention herewith shown and described is to be taken as an illustrative embodiment of the same and that various changes in the shape, size and arrangement of parts may be resorted to without departing from the spirit of the invention

I claim:

1. In apparatus for bending heat softened glass sheets by pressing the same between opposed complemental shaping surfaces formed on opposed mold parts at least one of which is movable toward and away from the other and at least one of which includes a base member and a shaping rail mounted on said base member; the improvement in which said shaping rail is made up of a plurality of individual segments spaced apart end to end to form an open ring adapted to contact marginal portions only of a sheet to be bent, and means are provided for resiliently mounting said segments on said base for independent movement relative to one another.

2. Apparatus as defined in claim 1 in which said mounting means comprises individual yieldable supporting members mounting each of said segments separately on said base and capable of deflecting when said sheet is pressed between said mold members, and said members include guide means permitting deflection thereof only in a direction substantially parallel to the plane of movement of said mold members.

3. Apparatus as defined in claim 2 in which each of said segments is mounted on said base by at least two of said yieldable supporting members.

4. Apparatus for bending glass sheets as defined in claim 2, in which each said supporting member comprises a housing attached to said base member and having a cylindrical bore extending perpendicular to said base member; a rod having one end attached to said shaping rail and the other end extending into said bore; means guiding said rod for sliding movement parallel to said bore; and a spring received within said bore and acting between said base member and the end of said rod, said spring applying a predetermined quiescent force against said rod when said mold members are out of pressing engagement.

5. Apparatus for bending glass sheets as defined in claim 4, in which said housing is cup-shaped with the open end against said base member; and said rod comprises a first, small diameter dowel section attached to said rail and extending into said bore through a clearance hole provided in the closed end of said housing, and a second, enlarged cylindrical section slidingly received in said bore, said spring acting against said enlarged section and urging it against said closed end when said mold members are out of pressing engagement.

6. Apparatus for bending glass sheets as defined in claim 4, including means for supplying cooling air to the interior of said housing and means for exhausting it therefrom.